United States Patent
Del-Gallo et al.

(10) Patent No.: US 8,628,708 B2
(45) Date of Patent: Jan. 14, 2014

(54) METHOD FOR PRODUCING A PACKING STRUCTURE WITH CONTROL OVER THE DRYING STEP

(75) Inventors: Pascal Del-Gallo, Dourdan (FR); Emmanuel Baune, Maffliers (FR); Jerome Cantonnet, Brive (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 184 days.

(21) Appl. No.: 13/000,550

(22) PCT Filed: May 29, 2009

(86) PCT No.: PCT/FR2009/051016
§ 371 (c)(1), (2), (4) Date: Dec. 21, 2010

(87) PCT Pub. No.: WO2010/000999
PCT Pub. Date: Jan. 7, 2010

(65) Prior Publication Data
US 2011/0108514 A1 May 12, 2011

(30) Foreign Application Priority Data
Jul. 2, 2008 (FR) .................... 08 54498

(51) Int. Cl.
*C04B 40/02* (2006.01)
(52) U.S. Cl.
USPC .......................................................... 264/122
(58) Field of Classification Search
CPC .............. C04B 28/18; C04B 40/024
USPC .......................................................... 264/122
See application file for complete search history.

(56) References Cited

U.S. PATENT DOCUMENTS 3,454,362 A 7/1969 Spry
3,928,539 A 12/1975 Satoh et al.
(Continued)

FOREIGN PATENT DOCUMENTS

EP 0237827 9/1987
EP 0262031 3/1988
(Continued)

OTHER PUBLICATIONS

Judelson, Howard; "Operation of the Autoclaves"; p. 4, Jun. 8, 2004; accessed at http://oomyceteworld.net/protocols/autoclave%20operation.pdf on Jan. 31, 2013.*
(Continued)

*Primary Examiner* — Yogendra Gupta
*Assistant Examiner* — Alison Hindenlang
(74) *Attorney, Agent, or Firm* — Elwood L. Haynes

(57) ABSTRACT

The invention relates to a method for producing a packing structure, characterized in that it includes the following main steps: a) a step comprising the hydrothermal synthesis of the packing mass, performed using a mixture of quicklime and silica; and b) a step comprising the drying of the packing mass produced in step (a) at a temperature T2 of between 110° C. and 500° C., possibly with at least one intermediate stage performed at a temperature of between 111° C. and 350° C. over a period t2 selected such that the physisorbed water content of the packing mass is less than 0.5%.

7 Claims, 3 Drawing Sheets

(56) References Cited

U.S. PATENT DOCUMENTS

| | | | |
|---|---|---|---|
| 4,129,450 | A | 12/1978 | Flanigen et al. |
| 4,226,839 | A | 10/1980 | O'Neill et al. |
| 4,349,463 | A | 9/1982 | Flanigen |
| 4,349,643 | A | 9/1982 | Mohiuddin |
| 4,853,351 | A | 8/1989 | Takahashi et al. |
| 4,895,825 | A | 1/1990 | Deck et al. |
| 5,632,788 | A | 5/1997 | Rabren |
| 7,807,259 | B2 | 10/2010 | Cannet et al. |
| 7,972,667 | B2 | 7/2011 | Baune et al. |
| 2008/0022697 | A1* | 1/2008 | Cannet et al. .......... 62/46.3 |
| 2008/0090035 | A1 | 4/2008 | Baune et al. |

FOREIGN PATENT DOCUMENTS

| | | |
|---|---|---|
| EP | 0264550 | 4/1988 |
| EP | 1886982 | 2/2008 |
| EP | 1887275 | 2/2008 |
| FR | 2876687 | 4/2006 |
| JP | 01122917 | 5/1989 |
| JP | 2006001992 | 1/2006 |
| WO | WO 9316011 | 8/1993 |
| WO | WO 9829682 | 7/1998 |
| WO | WO 0012630 | 3/2000 |

OTHER PUBLICATIONS

PCTFR2009051017, International Search Report and Written Opinion, Oct. 19, 2009.
PCTFR2009051129, International Search Report and Written Opinion, Dec. 10, 2009.
Baux et al., "Comportement de la xonotlite exposée aux hautes températures" "Behavior of xonotlite exposed to high temperatures" [English Abstract], J Phys IV France (2004).
Boynton, "Chemistry and Technology of Lime and Limestone", Published 1980.
Eades et al. "Characterization of the Properties of Commerical Lime by Surface Area Measurements and Scanning Electron Microscopy", presented 1969.
Gebica, "Bedeutung verschiedener Einflussfactoren and Verfaren beim neuzeitlichen Kalkbrennen" "Importance of various influencing factors and methods in present day lime burning", published 1980.
Hong et al. "Phase Relations in the CaO-SiO2-H2O System to 200 Deg C at Saturated Steam Pressure", Cement and Concrete Research (2004).
Turkdogan et al. "Calcination of Limestone", Mar. 1973.
EP07301229, Search Report, Oct. 19, 2007.
FR0653120, Search Report, May 14, 2007.
FR0653119, Search Report, Apr. 3, 2007.
PCTFR2009051016, International Search Report and Written Opinion, Dec. 10, 2009.
PCTFR2009051017, International Search Report, Oct. 19, 2009.
PCTFR2009051129, Written Opinion, published 2011.

* cited by examiner

DTA/TGA curves for a specimen of porous mass after drying: demonstration of physisorbed water and chemisorbed water X-ray diffractogram of a specimen after hydrothermal synthesis for various drying times $t_2$ (0, 53, 73 and 88 h) under atmospheric pressure Impact of the water content on the solubility of acetylene in DMF

METHOD FOR PRODUCING A PACKING STRUCTURE WITH CONTROL OVER THE DRYING STEP

CROSS-REFERENCE TO RELATED APPLICATIONS

This application is a §371 of International PCT Application PCT/FR2009/051016, filed May 29, 2009, which claims §119(a) foreign priority to French application 0854498, filed Jul. 2, 2008.

BACKGROUND

1. Field of the Invention

The subject of the present invention is novel packing structures and their production process that are characterized in that the drying step is controlled by its operating parameters, namely the drying thermal cycle (temperature rise and drop rates, temperatures, times).

2. Related Art

It is known to use containers under pressure, containing gases such as acetylene, dissolved in a solvent such as acetone, in various medical and artisanal applications and especially to carry out welding, brazing and heating operations together with an oxygen bottle.

These containers are usually packed with solid filling materials intended to stabilize the gases that they contain, which are thermodynamically unstable under the effect of variations in pressure or temperature, and therefore liable to decompose during their storage, transport and/or distribution.

These materials must be sufficiently porous so as to make it easy to fill and release the gases contained in the container. They must also be incombustible and inert with respect to these gases and have good mechanical strength. These materials conventionally consist of porous silico-calcareous ceramic substances obtained for example from a homogeneous mixture, in water of quicklime or milk of lime and silica (especially in the form of quartz flour), as described in the documents WO-A-93/16011, WO-A-98/29682 and EP-A-262031, so as to form a slurry, which then undergoes a hydrothermal synthesis. Specifically, the slurry is introduced into the container to be packed, under a partial vacuum, which is then autoclaved at a certain pressure and temperature, and then dried in an oven so as to completely remove the water and form a monolithic solid mass of composition $Ca_xSi_yO_z, wH_2O_-$, having crystalline structures of the tobermorite and xonotlite type, possibly with residual quartz present. Various additives may be introduced into these mixtures of the prior art in order to improve the dispersion of the lime and silica and thus avoid forming structural inhomogeneities and shrinkage phenomena observed during the hardening of the porous mass. The filler materials obtained must in fact have a homogeneous porosity with no empty spaces, within the material and between the material and the container, in which empty spaces gas pockets could accumulate and run the risk of causing an explosion.

Document EP-A-264550 also indicates that a porous mass containing at least 50%, or at least 65% or even at least 75% by weight of crystalline phase (with respect to the weight of calcium silicate) makes it possible to meet the two requirements of compressive strength and resistance to shrinkage at the hydrothermal synthesis and firing temperatures.

Although the known porous masses are generally satisfactory from the standpoint of their mechanical strength, the fact remains that the properties of withdrawing gases trapped in these porous masses are at the present time insufficient and/or completely random. This random aspect is due to the lack of control of the phases formed and of the microstructure of the porous mass, due to the lack of control/understanding of the process and especially the hydrothermal synthesis step by controlling the operating parameters, namely the temperature rise rate, the synthesis temperature, the duration of the temperature hold and control of the cooling rate.

Indeed, depending on the operating conditions of the bottles (use temperature, work rate, amount of gas contained in the bottle, etc.), they do not always allow the gas that they contain to be continuously withdrawn, at a high flow rate, throughout the duration needed for certain applications, especially welding applications, with a maximum gas recovery rate, corresponding to the ratio of the amount of gas that can be used to the amount of gas initially stored. Now, it would be desirable to be able to satisfy a flow rate of 200 l/h continuously for 15 minutes and a peak flow rate of 400 l/h for 4 minutes, for a gas capacity equal to or greater than 50% at the start of the test (defined as the ratio of the amount of gas present at this instant to the amount of gas initially loaded into the container), the container having a diameter/length ratio of between 0.2 and 0.7, preferably between 0.35 and 0.5, for a minimum water capacity of one liter and preferably between 3 and 50 liters.

This insufficiency is due in particular to the thermal loss associated with extracting the gas from the solvent, which may prove to be very prejudicial to gas withdrawal. This thermal loss is not due mainly to the intrinsic conductivity of the silico-calcareous material (as a reminder, the void content is between 87 and 92%) but to the size (dimensions) of the needle-shaped crystals constituting the porous mass. This is because the smaller their size, (i) the larger the number of points of contact between them and ii) the lower the $d_{50}$ of the pore size distribution ($d_{50}$ is defined as the average spread of the pore distribution). This therefore handicaps conductive heat transfer, leading to a relatively long period of "unavailability of the bottle". This effect is to be correlated with the pore distribution. In the case of an acetylene bottle for example, the energy consumption is of the order of 600 joules per gram of acetylene extracted from the solvent. In practice, this results in the bottle being cooled considerably during withdrawal, leading to greater solubilization of the acetylene in the solvent and thus a drop in pressure, with repercussions on the withdrawal rate. The flow is finally exhausted when the pressure at the bottle outlet falls below atmospheric pressure.

SUMMARY OF THE INVENTION

Moreover, the temperature and pressure variations are not homogeneous within the container, which may lead to the appearance of mechanical stresses liable to degrade the porous mass over the course of time.

Added to the withdrawal difficulties are therefore mechanical strength problems liable to have safety repercussions.

Starting from this situation, one problem that arises is to provide a packing structure having satisfactory withdrawal properties and mechanical properties meeting the concerns for safety, and a process for producing such a structure.

One solution of the invention is a container packing structure comprising a crystalline phase containing 55 to 97% by weight of xonotlite crystallites and 3 to 45% by weight of tobermorite crystallites, characterized in that it comprises less than 15% by weight of intermediates of formula $Ca_xSi_yO_z$, w $H_2O$ with $1<x<16$, $1<y<24$, $4<z<60$ and $1<w<18$, including less than 5% by weight of $CaCO_3$ and less than 5% by weight de $SiO_2$, and in that said packing structure is homogeneous.

The term "homogeneous" is understood to mean that various samples taken locally at various points in the packing structure (for example axially at the top, at the center and at the bottom, and radially at the center (core of the mass) and close to the metal wall, etc.) give homogeneous analysis (X-ray diffraction, porosity, pore size distribution) results, that is to say each quantitative measurement differs from one region to another by no more than 10%.

This "homogeneous" character is important as it determines the homogeneity of the solvent-acetylene solution in the case of an acetylene bottle, and consequently the uniformity of the local fill factors over the entire volume of the container enclosing the packing structure. If the microstructure is not homogeneous within the mass, excess pressure is created locally in zones where the fill factor is greater than the nominal fill factor of the bottle. For example, simulations have shown that at 35° C. the pressure in a bottle could be shifted from 22.3 bar to 24 bar by taking as assumption a fill factor of 30% higher than the nominal fill factor for ⅓ of the volume of the mass.

Xonotlite is a calcium silicate of formula $Ca_6Si_6O_{17}(OH)_2$, which has repeat units consisting of three tetrahedra. Moreover, tobermorite is also a calcium silicate, of formula $Ca_5Si_6(O,OH)_{18}.5H_2O$, crystallized in orthorhombic form.

The most generally accepted mechanism of xonotlite formation from the precursors CaO and $SiO_2$, in a $CaO/SiO_2$ molar ratio of about 1, in the presence of water is the following:

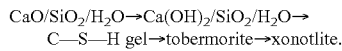

C—S—H gel→tobermorite→xonotlite.

The intermediate phases together preferably represent 0 to 10%, and more preferably 0 to 5%, of the weight of the crystalline phase finally present in the packing structure.

Calcium carbonate and silica each represent preferably less than 3% of the total weight of these crystalline phases.

Depending on the case, the packing structure may have one of the following characteristics:
 the crystallites are in the form of mutually entangled needles. The needles have a width of between 1 and 10 μm, a length of between 1 and 20 μm and a thickness of less than 5 μm, preferably less than 1 μm;
 said packing structure contains at least 70% by weight of crystalline phase;
 the crystallites are linked together so as to provide between them a pore diameter $D_{95}$ (the diameter at which 95% by volume of the pores have a smaller diameter) greater than or equal to 0.4 μm and less than 5 μm and a mean pore diameter $D_{50}$ (the diameter at which 50% by volume of the pores have a smaller diameter) greater than or equal to 0.4 μm and less than 1.5 μm;
 said packing structure has a compressive strength of greater than 15 kg/cm² i.e. 1.5 MPa. Its strength is preferably greater than 20 kg/cm², i.e. 2 MPa.

Advantageously, the packing structure has a total open porosity of between 80% and 92%. These values may all be measured by mercury porosimetry. It should be noted that the pore distribution is the result of the size of the crystallites and of their stacking, and therefore in large part the result of the hydrothermal synthesis conditions.

The compressive strength may be measured by taking a 100×100 mm² cube from the packing structure and applying, between two faces, a compressive force. The mechanical strength corresponds to the pressure (in kg/cm² or MPa) above which the material starts to crack.

By using a packing structure according to the invention it is possible to achieve the desired withdrawal rate, while still meeting the requirements in terms of safety and mechanical strength.

Apart from the crystalline phase described above, the packing structure according to the invention may comprise fibers chosen from carbon-based synthetic fibers, such as those described in particular in the document U.S. Pat. No. 3,454,362, alkaline-resistant glass fibers, such as those described in particular in document U.S. Pat. No. 4,349,643, partially delignified cellulose fibers, such as those described in particular in document EP-A-262 031, and mixtures thereof, without this list being exhaustive. These fibers are useful possibly as reinforcing materials, to improve the impact strength of the packing structure, and also make it possible to avoid cracking problems while the structure is being dried. Their role is also to present seeding/nucleation sites on which the xonotlite needles start to grow. These fibers may be used as such, or after treatment of their surface.

The packing structure may also include dispersing agents and/or binders, such as cellulose derivatives, particularly carboxymethylcellulose, hydroxypropylcellulose or ethylhydroxyethylcellulose, polyethers, such as polyethylene glycol, smectite-type synthetic clays, amorphous silica with a specific surface area of advantageously between 150 and 300 m²/g, and mixtures thereof, without this list being exhaustive.

Preferably, the packing structure contains fibers, in particular carbon and/or glass and/or cellulose fibers. The amount of fibers is advantageously less than 55% by weight, relative to all of the solid precursors employed in the process for producing the packing structure. Preferably, the amount is between 1 and 20% by weight.

In this context, and to achieve the specific porous structure described above, one subject of the present invention is a process for producing the packing structure, characterized in that it comprises the following steps:
a) a hydrothermal synthesis step for synthesizing the packing mass, carried out by mixing quicklime with silica; and
b) a drying step, for drying the packing mass resulting from step a) at a temperature $T_2$ between 110° C. and 500° C., with the possible existence of at least one intermediate temperature hold $T2'$ carried out at a temperature between 111° C. and 350° C., where $T2'<T_2$, for a time $t_2$ chosen such that the content of physisorbed water of the packing mass is less than 0.5%.

According to a different version of the present invention, one or more temperature holds may be chosen so as to act on the rate of water extraction, especially physisorbed water, and on the porous structure contained within the container, with (i) the release of water, especially physisorbed water, still contained within the porous mass after the hydrothermal synthesis step and (ii) when necessary, the termination of the primary role of the hydrothermal synthesis step, which consists in obtaining a mass having a maximum content of crystallographic constituents. To optimize the drying time $t_2$, a minimum of an intermediate temperature hold $T2'$ ($T2'<T_2$) may be chosen. Preferably, $T2'$ is between 111° C. and 350° C.

DETAILED DESCRIPTION OF THE INVENTION

Figure 1:
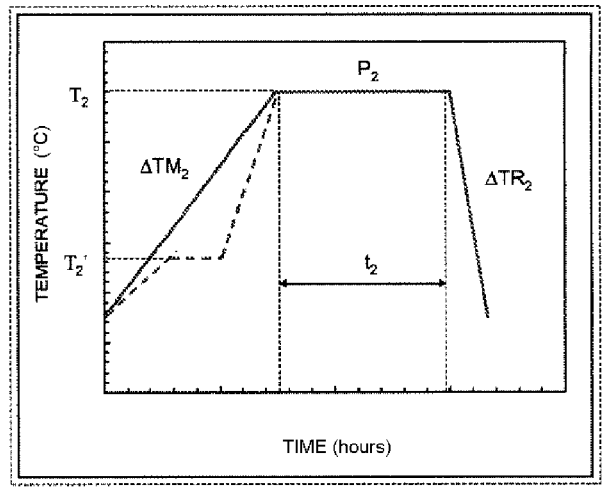
FIG. 1 is a diagram showing the parameters that influence the drying step of the process for producing the packing structure.

FIG. 1 is a diagram showing the parameters that influence the drying step of the process for producing the packing structure.

The term "physisorbed water" is understood to mean the free water released at a temperature above about 100° C. (<150-200° C.). This is residual water, contained in the porous structure without being chemically bound thereto. This is the largest amount of water released from the structure.

There is also the chemisorbed water, which is chemically bound to the surface of the material constituting the porous structure, released at a temperature above about 250° C. The amount of this water is lower than the previous one, but requires more energy to be released from the porous structure. Finally, there is also the water of crystallization, released at higher temperature, above about 600° C. This water forms an integral part of the crystallites (xonotlite, tobermorite, etc.). If this water is released, the crystalline structure is altered. C. Baux, C. Daiguebonne, C. Lanos, O. Guillou, R. Jauberthie and Y. Gérault, "Comportement de la xonotlite exposée aux hautes températures [*Behavior of xonotlite exposed to high temperatures*]," J. Phys. IV, France, 118, pp. 267-276, 2004, state that there is a transformation from xonotlite $[Ca_6Si_6O_{17}(OH)_2]$ to wollastonite $(CaSiO_3)$ above a temperature of around 600° C. Between 650 and 900° C., it is reported that a transformation to wollastonite and coesite $(SiO_2)$ occurs.

The various water contents (physisorbed water, chemisorbed and structural water) of the packing mass can be measured using a differential thermal analysis/thermogravimetric (DTA/TGA) instrument.

Differential thermal analysis (DTA) is based on characterizing the endothermic or exothermic behavior characteristic of a material during physical or chemical transformations as a function of temperature. The temperature difference between the specimen and a thermally inert reference body within the temperature range explored is recorded. All phase changes, crystallizations or chemical reactions, in particular the release of water from the specimen characterized, which consume heat within the specimen or release heat therefrom, give rise to a temperature difference between the specimen and its environment.

Depending on the case, the production process may have one of the following features:
the time $t_2$ is chosen such that the content of physisorbed water of the packing mass resulting from step a) is less than 0.3%;
the time $t_2$ is chosen such that the content of physisorbed and chemisorbed water of the packing mass is less than 0.5%, preferably less than 0.25%;
the hydrothermal synthesis step a) comprises:
(i) a temperature rise substep during which an initial quicklime/silica mixture is heated, over a time of less than 10 h, to a temperature $T_1$ of between 150 and 300° C.;
(ii) a packing mass producing substep carried out:
using the quicklime/silica mixture resulting from step (i), at a temperature $T_1$ of between 150 and 300° C.,
for a rise to the temperature $T_1$ that takes place over a time $\Delta t1$ of less than 2 h,
at a pressure P1 of between $5\times10^5$ Pa and $25\times10^5$ Pa and for a time of between 10 h and 70 h; and
(iii) a cooling substep, during which the packing mass resulting from step (ii) is cooled, over a time of between 1 and 48 h, from the temperature $T_1$ to room temperature.
the quicklime is obtained by the calcination, at a temperature of at least 850° C. for at least one hour, of limestone blocks such that at least 90% by weight have a size of 1 to 15 mm, said limestone having a purity of at least 92% by weight and an open porosity ranging from 0 to 25%;
the drying step is carried out at a temperature of 300 to 450° C. for the main temperature hold; and
in step b), the rate of rise $\Delta TM_2$ to the temperature $T_2$ is less than 25° C./h and the rate of fall $\Delta TR_2$ to room temperature from $T_2$ is greater than 25° C./h.

The rate of rise $\Delta TM_2$ to the temperature $T_2$ is chosen in such a way that the mechanical stresses generated by the departure of the water, especially physisorbed water, contained within the porous structure are not high enough to cause the structure to be degraded, in particular do not cause cracks to appear.

For a temperature Tp of about 200° C., there must no longer be any physisorbed free water. The time $t_2$ will therefore be adjusted so as to have in the end less than 0.5% residual water for Tp>200° C.

According to the simplest form of the invention, $\Delta TR_2$ corresponds to a cooling of the containers in the open air.

The term "purity" is understood to mean the percentage calcium carbonate by weight in the limestone.

A person skilled in the art will know how to identify the worked quarries or veins enabling the aforementioned limestone blocks to be obtained.

The type of packing structure according to the invention is firstly the consequence of preparing a quicklime having a satisfactory reactivity and capable of forming, after hydrothermal synthesis and calcination, the desired acicular material. The next step of the process consists in mixing the quicklime with silica, which may be amorphous or crystalline, in a $CaO/SiO_2$ molar ratio of 0.8 to 1. Furthermore, the ratio of water to solid precursors (lime+silica) is preferably between 2 and 60, more preferably between 3 and 25.

The mixture is then introduced into the containers to be packed and undergoes hydrothermal synthesis. To succeed, the hydrothermal synthesis must be carried out:
at a hydrothermal synthesis temperature $T_1$, which may be between 150 and 300° C., preferably between 180 and 250° C.;
at a pressure of between $5\times10^5$ Pa and $25\times10^5$ Pa (5 and 25 bar), preferably between $7\times10^5$ Pa and $15\times10^5$ Pa (7 and 15 bar). According to a first embodiment, the synthesis may be carried out by introducing the mixture into the open container that is intended to be packed, and then placing the container in an autoclave oven under the pressure described above. According to a second embodiment, the hydrothermal synthesis may be carried out by placing the mixture in the container that it is intended to pack, closing said container with a plug fitted with a pressure regulation system (such as a valve), pressurizing the container to a pressure ranging from atmospheric pressure to the pressures described above, and then placing this container in an unpressurized oven;
for a time ranging, depending on the volume of the container to be packed, from 10 h to 70 h, for example about 40 hours for a container having a water volume of between 3 and 50 liters, preferably equal to 6 liters;

the temperature rise $\Delta T_1$ to $T_1$ must take place over a time of less than 10 h, preferably less than 2 h. When several containers packed with packing material are placed within the same oven, this parameter takes into account the positioning of the bottles with respect to one another. This is because the bottles are heated by circulation of heated air inside the synthesis oven. This air circulation will depend strongly on the number and position of the bottles placed in the oven. It is necessary to limit the variations in temperature rise time, since this parameter has a direct impact also on the rate of crystallization of the needles of the $Ca_xSi_yO_z,w.H_2O$ compounds formed; and the drop from $T_1$ down to room temperature takes between 1 and 48 h, preferably between 1 and 25 h, depending on the temperature drop rate $\Delta TR_1$.

An optional additional step at this stage of the process may consist in suddenly cooling the bottles by spraying them with a shower, right from the end of the synthesis cycle ($T_1$, $t_1$, $P_1$) or by quenching in water or an appropriate heat-transfer liquid.

The drying (calcination) step has the primary function not only of removing the physisorbed and/or chemisorbed residual water but also (i) of giving the treated porous mass a predominantly crystalline structure and thus perfecting the hydrothermal synthesis step and (ii) of removing any trace of water so as to maximize the dissolution of the acetylene in the acetone.

Specifically, if after the hydrothermal synthesis the predominant phase is not the desired xonotlite, and a significant amount of tobermorite and/or residues of the precursor phases (CaO, $SiO_2$) remain, the drying step may continue and complete the crystallization of xonotlite.

A container packed with a packing structure must pass a standardized flammability test (for example according to the ISO 3807 standard) before it can be used by a customer. Experience shows that success in passing this flammability test, in other words the intrinsic safety of the container, is conditional on its initial pressure. This pressure depends both on the microstructure of the packing mass, largely conditional on the hydrothermal synthesis step of the production process and, to a lesser extent, on the drying step, but also on the residual content of water that may be present within the mass, conditional on the drying step of the production process—hence control of the drying operating parameters in the production process according to the invention.

Figure 4:
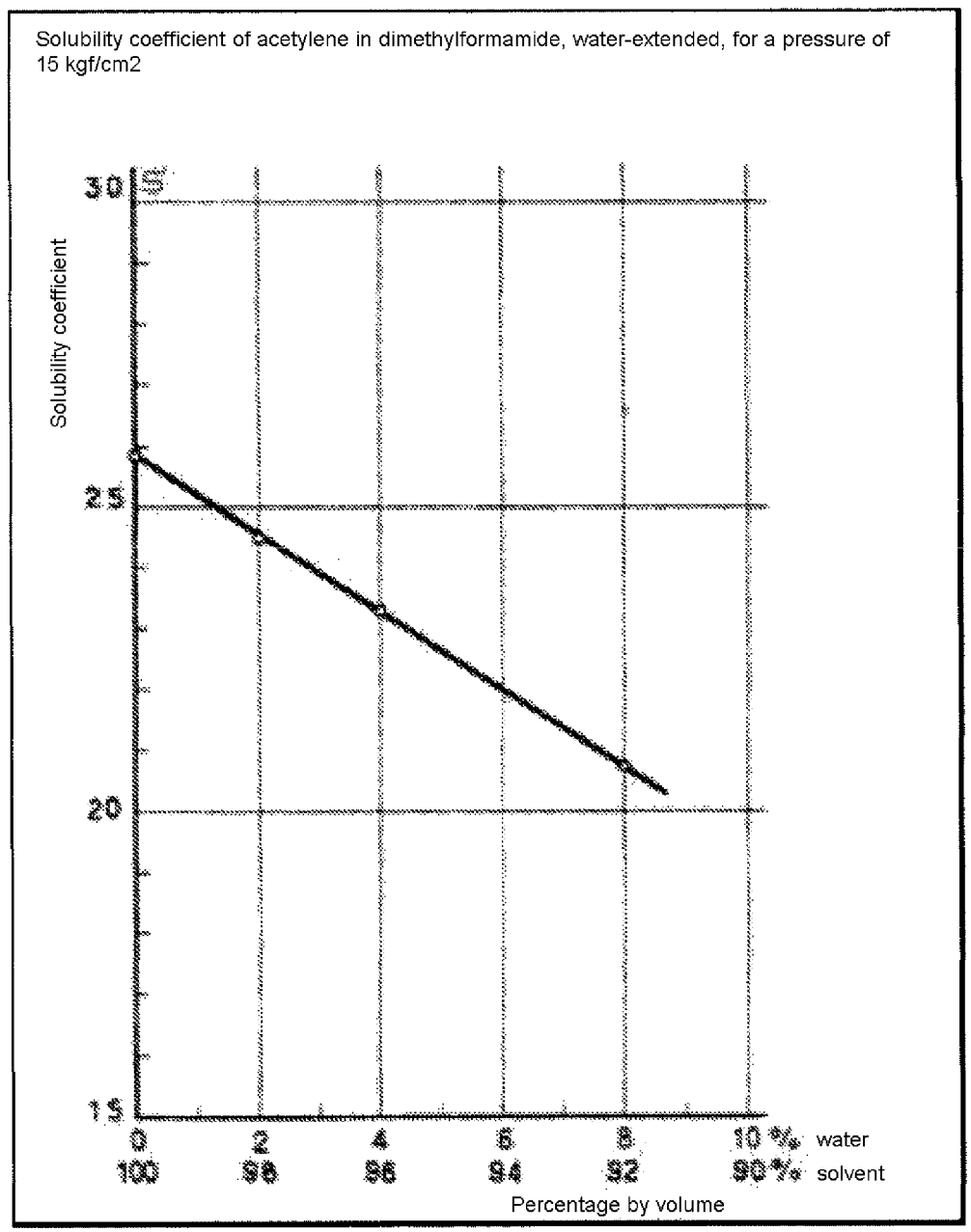
FIG. 4 shows that the presence of 1% water in the solvent (in this particular case, DMF), causes a 2.8% variation in the solubility coefficient of acetylene.

The residual water content affects the capacity of the fluid, for example acetylene, to dissolve in the solvent (for example dimethylformamide or DMF), as indicated in FIG. 4. The solubility coefficient "s" of acetylene in acetone or DMF is defined as the ratio of the acetylene volume dissolved in a unit volume of solvent under pressure, at a temperature of 15° C. FIG. 4 shows that the presence of 1% water in the solvent (in this particular case, DMF), causes a 2.8% variation in the solubility coefficient of acetylene. Consequently, and as an example, at 35° C. the pressure in a bottle prepared for a flammability test would be 22.9 bar instead of 22.3 bar for a water content in the solvent of 1 wt %. It has been found that this 1% value is perfectly possible in packed bottles resulting from a standard packing process, given in particular the imperfectly concluded drying cycle at the end of the production process.

Figure 2:
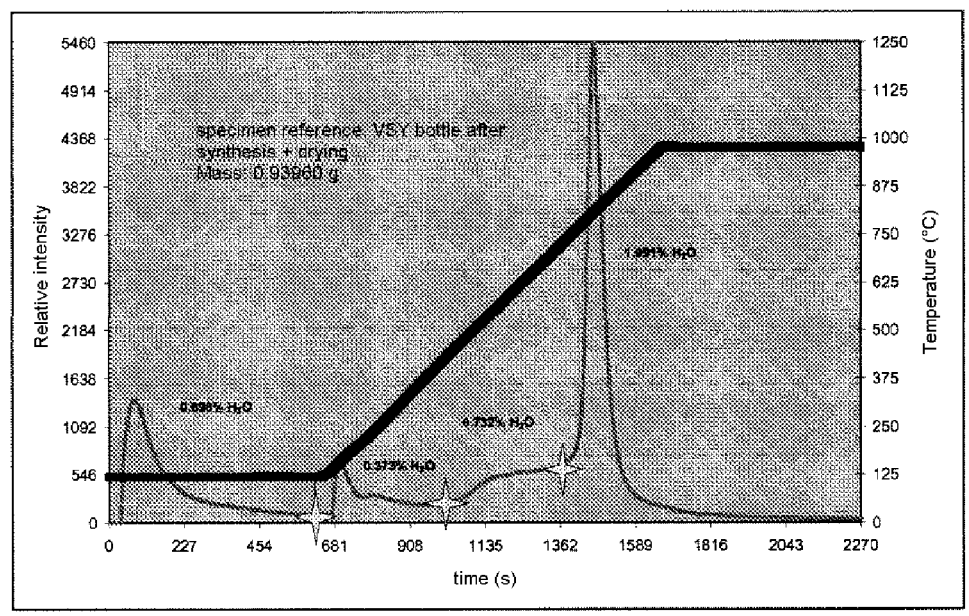
FIG. 2 shows a curve of the measured residual moisture at the end of drying in a bottle resulting from the standard production process.

FIG. 2 shows a curve of the measured residual moisture at the end of drying in a bottle resulting from the standard production process. The curve characterized by two breaks, plotted in bold, indicates the temperature rise cycle, imposed on the characterized specimen, from 100° C. to about 1000° C. The other curve indicates the rate of weight loss represented by the removal of physisorbed or chemisorbed water from the specimen as the temperature rises during the test.

Figure 3:
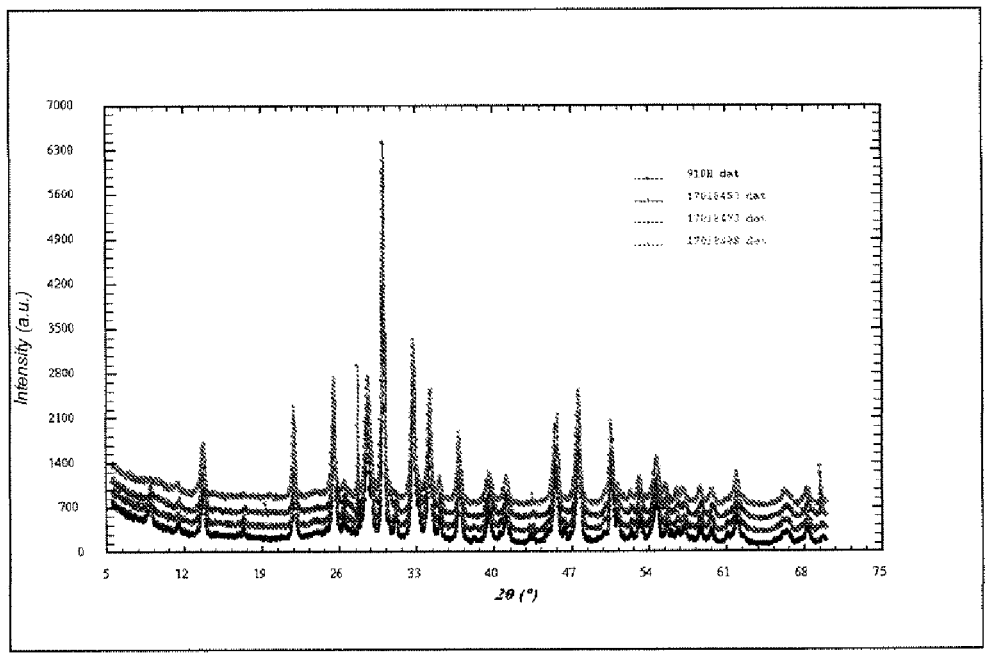
FIG. 3 illustrates for a bottle having a volume of 5.8 liters resulting from a standard production cycle, and therefore including a drying step up to about 370° C. for a total time of 88 h, a residual water content of 1.27%, composed of 0.90% physisorbed water (water released up to a temperature of 125° C.) and 0.37% chemisorbed water (water released up to about 350-400° C.).

FIG. 3 shows, for a bottle having a volume of 5.8 liters resulting from a standard production cycle, and therefore including a drying step up to about 370° C. for a total time of 88 h, a residual water content of 1.27%, composed of 0.90% physisorbed water (water released up to a temperature of 125° C.) and 0.37% chemisorbed water (water released up to about 350-400° C.). It is precisely this amount of water not bound to the packing structure which it is important to proscribe at the end of the production cycle in order to increase the safety of the packed container. In FIG. 2, the peak corresponding to the 1.99% water loss of the specimen corresponds to the degradation of the crystallographic constituents of the packing mass (xonotlite, tobermorite, etc.) into wollastonite ($CaSiO_3$) (above ~700° C., as mentioned in the literature). One of the benefits of the drying cycle is that the amount of physisorbed and chemisorbed water is minimized to a total content of less than 0.5% of the total weight of the porous mass.

It has been found, on bottles obtained from the standard production process, that the drying cycle could result in a change in the crystallographic nature of the phases present in the porous mass after the hydrothermal synthesis. As an example, this has been confirmed on a bottle taken after synthesis of a composition comprising about 40% xonotlite, about 50% tobermorite 11 Å, 5% $CaCO_3$, 3-5% $SiO_2$ and an amount of amorphous phase not quantifiable by X-ray diffraction. After drying at a temperature of 370° C. for 88 h, a composition comprising about 60% xonotlite, about 30% 9 Å tobermorite, about 1-2% 11 Å tobermorite, 5% $CaCO_3$ and 2-3% $SiO_2$ was observed. Furthermore, better crystallization after drying was noted, the amorphous fraction appearing much smaller than in the case of specimens coming from the same bottle, but not dried.

Moreover, the data in Table 1 and in FIG. 3 indicate the X-ray diffraction results for the same porous specimen obtained by the production process, taken at the end of hydrothermal synthesis, not dried ($t_2$=0) and then dried according to the drying parameters $\Delta TM_2$=5° C./h, $T_2$=370° C. and $\Delta TR_2$=50° C./h and for successive drying times $t_2$ of 53 h, 73 h and 88 h. In view of the results, it is clear that the state of crystallization of the specimen studied increases for increasing drying time $t_2$. In particular, the contents of minor compounds, namely the precursors $CaCO_3$ and $SiO_2$ and tobermorite, decrease and the xonotlite content, the final crystallographic compound for the precursors in question, increases.

TABLE 1

Change in the crystalline phases, all process parameters being identical except for the duration (from 0 to 88 h) of the temperature hold in the drying step

| Bottle specimen 84: 370° C. drying time after hydro-thermal synthesis | $CaCO_3$ | $SiO_2$ | 11 Å tober-morite | 9 Å tober-morite | Xonot-lite* |
|---|---|---|---|---|---|
| 0 h | 1 to 2% | 1 to 2% | 3 to 5% | — | ≥91% |
| 53 h | — | 1 to 2% | 3 to 5% | — | ≥93% |
| 73 h | — | 1 to 2% | — | — | ≥98% |
| 88 h | — | 1 to 2% | — | — | ≥98% |

*Estimated: % xonotlite = 100 − $\Sigma\%_{max}$ of other crystalline phases

The drying operation is carried out in a conventional electric oven, which may or may not be the same as that used for the hydrothermal synthesis operation. The drying (or calcination) operation is carried out at atmospheric pressure.

Another subject of the invention is a container containing a packing structure as described above, which container is capable of containing and delivering a fluid.

The container usually comprises a metal casing containing the packing structure described above. The metal casing may be made of a metallic material such as steel, for example a standardized carbon steel P265NB according to the NF EN10120 standard, the thickness of which enables it to withstand at least the pressure of the hydrothermal synthesis without any risk of an accident and capable of withstanding the 60 bar (6 MPa) proof pressure, this being the statutory pressure for filling with acetylene under the conditions described above. The container is also usually of cylindrical shape and generally provided with closure means and a pressure regulator. This container preferably has a diameter/length ratio of between 0.2 and 0.7, more preferably between 0.35 and 0.5, and a minimum water capacity of one liter. Usually, such a container takes the form of a bottle.

The fluids stored in the packing structure according to the invention may be gases or liquids.

The following gases may be mentioned: pure compressed gases or mixtures of compressed gases in gaseous or liquid form, such as hydrogen, gaseous hydrocarbons (alkanes, alkynes and alkenes), nitrogen and acetylene, and gases dissolved in a solvent, such as acetylene and acetylene/ethylene or acetylene/ethylene/propylene mixtures, dissolved in a solvent such as acetone or dimethylformamide (DMF).

The following liquids may in particular be mentioned: organometallic precursors, such as the Ga and In precursors used in particular in electronics, and also nitroglycerine.

In particular, the container according to the invention contains acetylene dissolved in DMF or in acetone.

The present invention enables the drawbacks of the prior art, mentioned above, to be overcome using a specific porous structure (pore volume, pore shape and size distribution, tortuosity, homogeneity) and links or bridges between crystallites that may be obtained by controlling the various steps of the process, especially the drying step following the hydrothermal synthesis step.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for producing a container packing structure comprising a crystalline phase containing 55 to 97% by weight of xonotlite crystallites and 3 to 45% by weight of tobermorite crystallites, less than 15% by weight of intermediates of formula:

$$Ca_xSi_yO_z, wH_2O \text{ with } 1 \leq x \leq 16, 1 \leq y \leq 24, 4 \leq z \leq 60 \text{ and } 1 \leq w \leq 18,$$

and having less than 5% by weight of $CaCO_3$ and less than 5% by weight of $SiO_2$, said packing structure being homogeneous, characterized in that it comprises the following main steps:
  a) a hydrothermal synthesis step for synthesizing the packing mass, carried out by mixing quicklime with silica; and
  b) a drying step, for drying the packing mass resulting from step a) with at least one intermediate temperature hold T2' carried out at a temperature between 111° C. and 500° C. prior to a drying hold at a temperature T2 between 110° C. and 500° C. for a time t2 chosen such that the content of physisorbed water of the packing mass is less than 0.5%,
to produce the container packing structure comprising a crystalline phase containing 55 to 97% by weight of xonotlite crystallites and 3 to 45% by weight of tobermorite crystallites, less than 15% by weight of intermediates of formula:

$$Ca_xSi_yO_z, wH_2O \text{ with } 1 \leq x \leq 16, 1 \leq y \leq 24, 4 \leq z \leq 60 \text{ and } 1 \leq w \leq 18,$$

and having less than 5% by weight of $CaCO_3$ and less than 5% by weight of $SiO_2$, said packing structure being homogeneous.

2. The process of claim 1, wherein the time $t_2$ is chosen such that the content of physisorbed water of the packing mass resulting from step a) is less than 0.3%.

3. The process of claim 1, wherein the time $t_2$ is chosen such that the content of physisorbed and chemisorbed water of the packing mass is less than 0.5%.

4. The process of claim 1, wherein the hydrothermal synthesis step a) comprises:
  (i) a temperature rise substep during which an initial quicklime/silica mixture is heated, over a time of less than 10 h, to a temperature $T_1$ of between 150 and 300° C.;
  (ii) a packing mass producing substep carried out:
    using the quicklime/silica mixture resulting from step (i),
    at a temperature $T_1$ of between 150 and 300° C.,
    at a pressure P1 of between $5 \times 10^5$ Pa and $25 \times 10^5$ Pa and for a time of between 10 h and 70 h; and
  (iii) a cooling substep, during which the packing mass resulting from step (ii) is cooled, over a time of between 1 and 48 h, from the temperature $T_1$ to room temperature.

5. The process of claim 1, wherein the quicklime is obtained by the calcination, at a temperature of at least 850° C. for at least one hour, of limestone blocks such that at least 90% by weight have a size of 1 to 15 mm, said limestone having a purity of at least 92% by weight and an open porosity ranging from 0 to 25%.

6. The process of claim 1, wherein the drying step is carried out at a temperature of 300 to 450° C. for the main temperature hold.

7. The process of claim 1, wherein, in step b), the rate of rise $\Delta TM_2$ to the temperature $T_2$ is less than 25° C./h and the rate of fall $\Delta TR_2$ to room temperature from $T_2$ is greater than 25° C./h.

* * * * *